Dec. 2, 1958   R. P. PIERCE ET AL   2,862,743
CABLE COUPLING
Filed Dec. 7, 1953
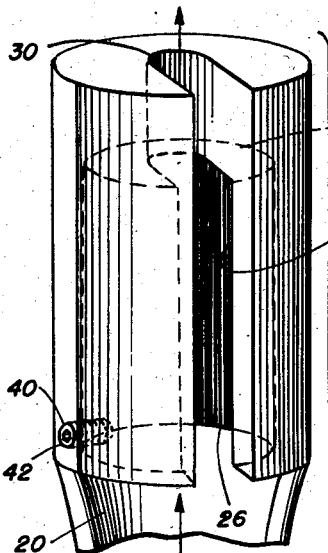
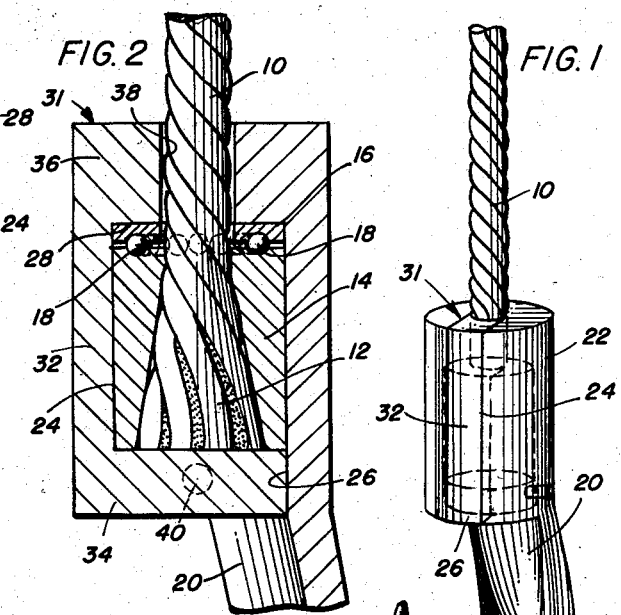
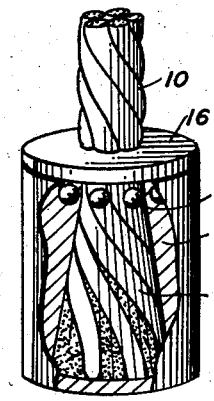
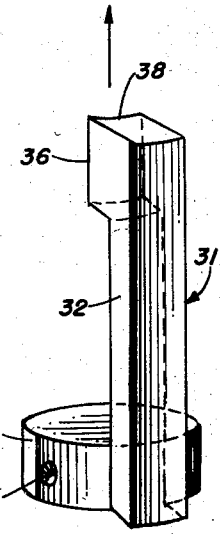
FIG. 1
FIG. 2
FIG. 3
FIG. 4
INVENTORS:
ROBERT P. PIERCE
EDMOND E. BUFFUM
BY
ATT'Y

2,862,743

CABLE COUPLING

Robert P. Pierce and Edmond E. Buffum, Coos Bay, Oreg.

Application December 7, 1953, Serial No. 396,565

2 Claims. (Cl. 287—91)

This invention relates to couplings for joining the end of a cable to a hook or the end of two cables together and is more particularly described as an end fastening for a metal cable in which the end of the cable may be rotated with respect to the fastening or to another cable.

An important object of the invention is to provide a new and improved cable coupling in which a removable key member is provided to facilitate quick and easy attachment and detachment so that the rope is firmly held and is not likely to be disengaged by a heavy load, vibration, or in any other manner than the intentional removal of the securing key.

A further object of the invention is to provide a novel cable end clamp and swivel socket in which the cable may be rotated relative to the clamp in connection with novel means for detachably connecting the cable in the clamp but permitting a rotary movement thereof.

Still a further object of the invention is to provide a cable coupling of the detachable type by means of which two cable ends are quickly and easily attached or disconnected from a single end to end connector common to both of them.

A still further object of the invention is to provide a cable coupling which is simple, easily operated, substantially fool-proof and easily and economically made.

Other objects of the invention will appear in the specification and will be apparent from the accompanying drawings in which, Fig. 1 is a side elevation of a cable coupling in accordance with this invention as attached to a single hook.

Fig. 2 is a sectional view of the structure shown in Fig. 1.

Fig. 3 is an exploded view showing parts of the socket, the cable end and the locking key in accordance with Fig. 2; and Fig. 4 is a side elevation representing this cable connector as incorporated in a double end joint for two cable ends.

This invention is particularly adaptable for making heavy duty cable connections for logging operations and the like, permitting the splicing, joining or interchanging of cables with a minimum of time and effort and at the same time making hook connections with any number or combination of cables merely by using different numbers or combinations of the sleeve.

Referring now more particularly to the drawings, the end of a cable 10 is represented as connecting it in an ordinary well known manner by splaying the ends 12 of the wires which make up the cable and in casting a plug 14 of metal thereon firmly embedding the wires in a well known manner. A compression disc 16 is mounted at the inner end of the plug 14 surrounding the cable 10 and it is connected to the plug for free rotary movement by anti-friction bearings as represented by freely rotatable discs or balls 18. The disc is freely rotatable at the inner end of the plug and the balls adapted to receive a substantial end thrust.

An open end hook 20 is shown in Fig. 1 having a sleeve 22 attached thereto at one side, the sleeve having a recess 24 with an end opening 26 at the hook end partially rounded at the inside for a distance sufficient to admit the plug to the sleeve at this end, and a slot 28 at one side of the sleeve of a width substantially the thickness or diameter of the cable 10 to be used therein, the slot extending in a curve 30 at the center to receive the cable 10 coaxially therein.

Thus the plug and sleeve with the hook attached may be moved relatively to each other so that the plug may be inserted in the open end 26 of the recess 24, the slot 28 permitting the seating of the plug in the recess by receiving the adjacent portion of the cable therethrough and then pulling the plug into the recess 24 until the disc 16 engages the inner end thereof. A key 31 has a substantially rectangular bar 32 of a width to fit in the slot 28 and a circular bottom 34 of the diameter of the opening 26 to the recess 24 and at the top of the key is a projection 36 with a concave inner end 38 corresponding to the curvature of the cable 10, this projection filling the space formed by the slot 28 and from the outer edge of the sleeve extending to and nearly in contact with the cable seated at the center of the sleeve.

At one side of the sleeve is a threaded opening 40 for receiving a set screw 42 therein, the inner end of the screw engaging a recess 44 at one side of the circular bottom 34 so that after the key is in place, it is locked therein by this screw.

In operation, after the cable plug is inserted in the recess 24, the key is applied to the opening 26 of the recess by placing the bottom of the key at the outer end of the plug with the projection 36 extending over the opposite end of the plug and sliding them together into the recess 24, the bar 32 of the key sliding in the slot 28 of the sleeve.

When the sleeve 22 is a part of an end hook 20, a cable thus attached thereto may be quickly attached to or detached from other cables or from other connections for the hook. This arrangement permits the cable 10 to swivel freely while under tension or load and several lines may be joined quickly and easily either to another line or connection or several lines connected to a common line.

Instead of connecting the cables to a single hook, two cables may be similarly joined by a common sleeve 46 as shown in Fig. 4 open at the center and closed at the ends except for slots 50 for seating the keys 31 therein at the ends and surrounding the cables 10. Intermediate the ends of the sleeve is an opening 48 which is as long as the length of the key so that a cable with its plug 14 attached thereto and its key 31 applied over the plug may be inserted in the central opening 48 and the key 31 rotated or positioned until its bar 32 registers with a slot 50 in the wall of the sleeve 46 so that the plug and the key 31 may then be moved outwardly from the recess 48 in one direction or the other depending upon which end of the sleeve is to be engaged by the plug for a cable 10.

With this coupler, two cable ends may be attached together, a cable may be spliced or a cable may be attached to one end and some other connection may be similarly attached to the other end. Each cable end and locking key may be held in place by a set screw 42, and by a set screw 43, if desired.

This construction will eliminate any splicing of the cable; it permits the use of different lines at choice merely by breaking connections at designated points by connecting hook end cables thereto; and eliminates the necessity of restringing an entire cable or lay-out.

While a preferred construction of the invention has been described in some detail, it should be regarded as an illustration or example rather than as a limitation or restriction of the invention, since various changes in the construction, combination and arrangement of the parts may be made without departing from the spirit and scope of the invention.

We claim:

1. In a cable coupling, a sleeve open at one end and closed at the other end except for a slot substantially as wide as the diameter of a cable therefor extending along one side and terminating in an opening at the center of the closed end to receive the cable closely therein, a cable having a plug at the end insertable in the open end and to fit closely in the sleeve as the cable is inserted through the slot to the opening in the closed end thereof, a key having a bottom to fit closely within the open end of the sleeve with an integral rectangular bar at the periphery of the bottom to fit in and substantially close the slot at the side of the sleeve and an inward integral projection at the end of the bar opposite the bottom to extend in the slot at the closed end of the sleeve and to fit about the cable extending through the opening thereof, the open end of the sleeve and the slot at one side being of a length to receive the plug at the end of the cable and the bottom, rectangular bar and inward projection of the key entirely within and flush with the outside of the sleeve, and locking means extending through the sleeve near the open end thereof and engaging the bottom of the key for holding it in place in the sleeve.

2. A cable coupling in accordance with claim 1 comprising a coupling bar with a central lateral recess and opposite sleeves, each opening oppositely therefrom and toward the ends thereof, each end having a slot extending from said lateral recess to the central opening at the end thereof and a cable and plug for each end of the bar insertable from the lateral recess and through the slot thereof, a key for each end of the bar, the bottom of which is insertable through the said lateral recess, and means to lock each key in the open end of its sleeve.

References Cited in the file of this patent

UNITED STATES PATENTS

| 127,177 | Luther | May 28, 1872 |
| 740,026 | Krohn | Sept. 29, 1903 |
| 1,073,470 | Burns | Sept. 16, 1913 |
| 1,267,430 | McConnell | May 28, 1918 |
| 2,055,667 | Murray | Sept. 29, 1936 |
| 2,123,783 | Keltner | July 12, 1938 |
| 2,152,233 | Baker | Mar. 28, 1939 |
| 2,289,837 | Cruver | July 14, 1942 |
| 2,301,009 | Wirkkala | Mar. 6, 1945 |
| 2,487,085 | Wridge | Nov. 8, 1949 |

FOREIGN PATENTS

| 679,621 | Great Britain | Sept. 24, 1952 |